(12) United States Patent
Kobayashi et al.

(10) Patent No.: US 8,446,804 B2
(45) Date of Patent: May 21, 2013

(54) DISC INSPECTING METHOD AND DISC INSPECTING DEVICE

(75) Inventors: Hiroaki Kobayashi, Chiba (JP); Toru Aida, Kanagawa (JP); Akitoshi Suzuki, Shizuoka (JP)

(73) Assignees: Sony Corporation, Tokyo (JP); Sony DADC Corporation, Tokyo (JP)

( * ) Notice: Subject to any disclaimer, the term of this patent is extended or adjusted under 35 U.S.C. 154(b) by 0 days.

(21) Appl. No.: 13/235,836

(22) Filed: Sep. 19, 2011

(65) Prior Publication Data

US 2012/0087222 A1   Apr. 12, 2012

(30) Foreign Application Priority Data

Oct. 8, 2010   (JP) ................................ 2010-228373

(51) Int. Cl.
*G11B 15/52*   (2006.01)
(52) U.S. Cl.
USPC .................................... 369/47.49; 369/53.31
(58) Field of Classification Search
None
See application file for complete search history.

(56) References Cited

U.S. PATENT DOCUMENTS

| 4,954,723 | A  | * | 9/1990 | Takahashi et al. ....... 250/559.18 |
| 6,388,744 | B1 | * | 5/2002 | Kubota et al. .............. 356/237.3 |
| 6,541,748 | B1 | * | 4/2003 | Asahina ..................... 250/201.5 |
| 2004/0052165 | A1 | * | 3/2004 | Kuribayashi et al. ...... 369/13.27 |
| 2011/0085430 | A1 | * | 4/2011 | Kadowaki et al. ......... 369/53.34 |

FOREIGN PATENT DOCUMENTS

JP   58-74108 U   5/1983

* cited by examiner

*Primary Examiner* — Paul Huber
(74) *Attorney, Agent, or Firm* — Oblon, Spivak, McClelland, Maier & Neustadt, L.L.P.

(57) ABSTRACT

A disc inspecting method includes: forming recording marks on a disc; scanning the recording marks from inside to outside or from outside to inside of the disc by a pickup unit to read a reproduction signal while rotating a spindle to move a slider by each predetermined width; acquiring reproduction data from the reproduction signal in a signal acquiring unit; and determining whether or not the reproduction data is proper in a calculation unit, and optimizing a formation condition of the recording marks when it is determined that the reproduction data is not proper.

12 Claims, 8 Drawing Sheets

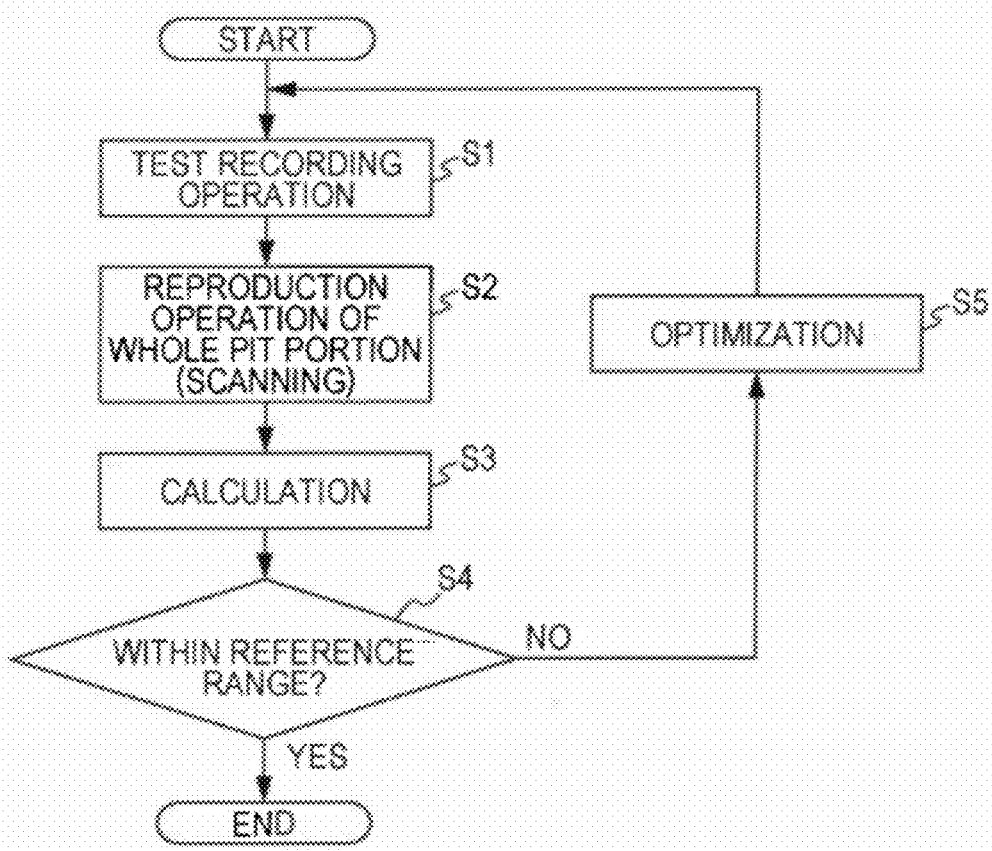

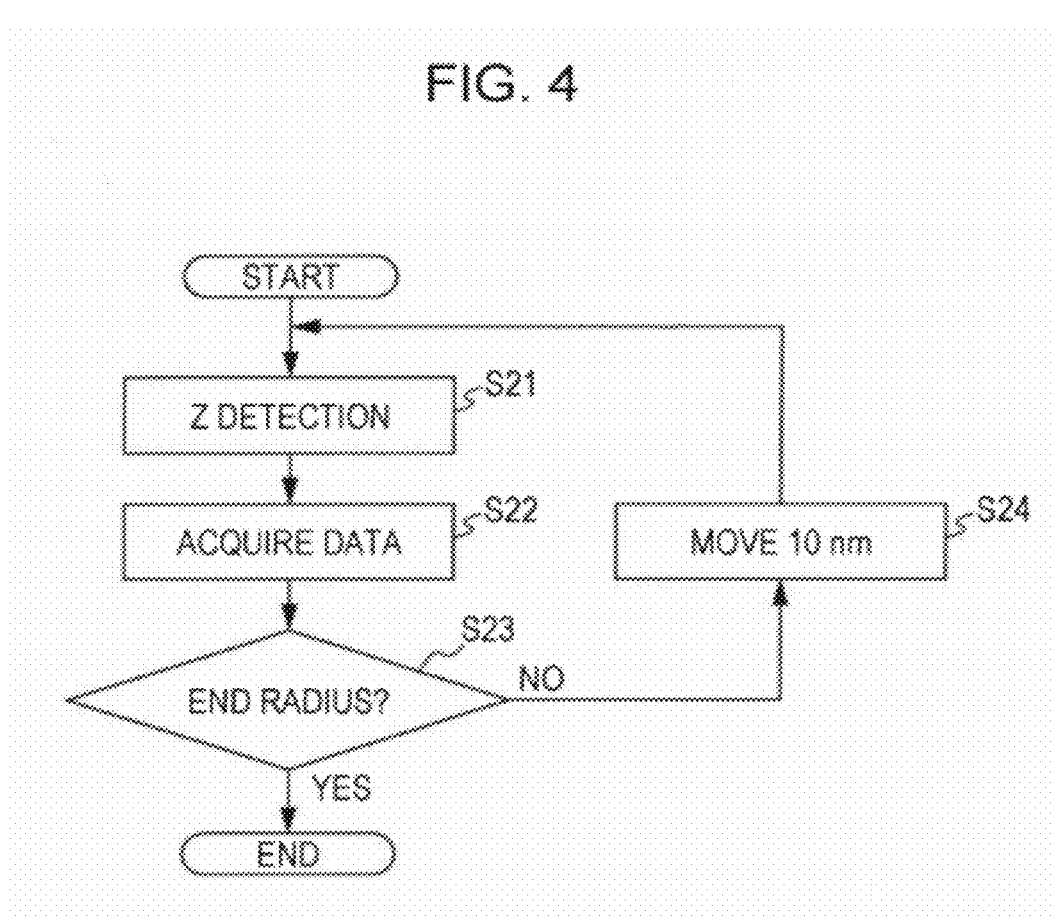

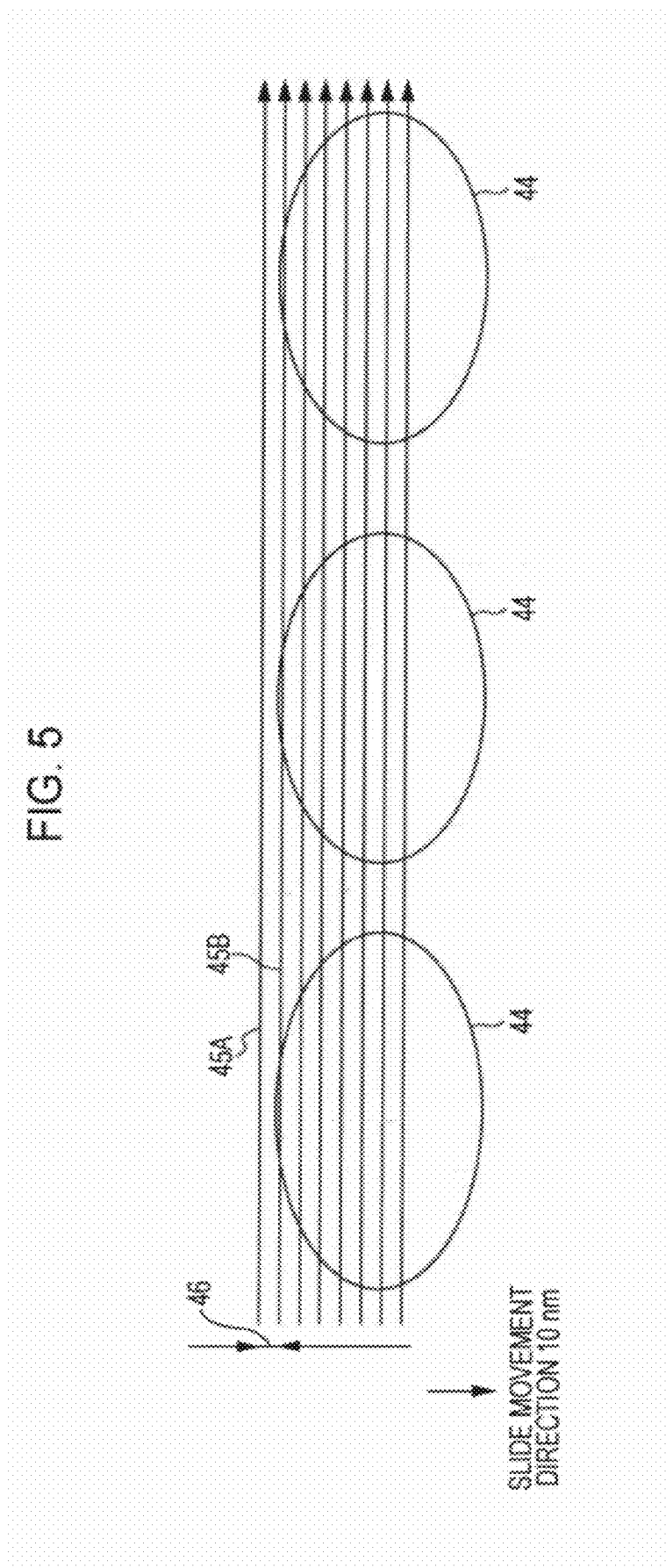

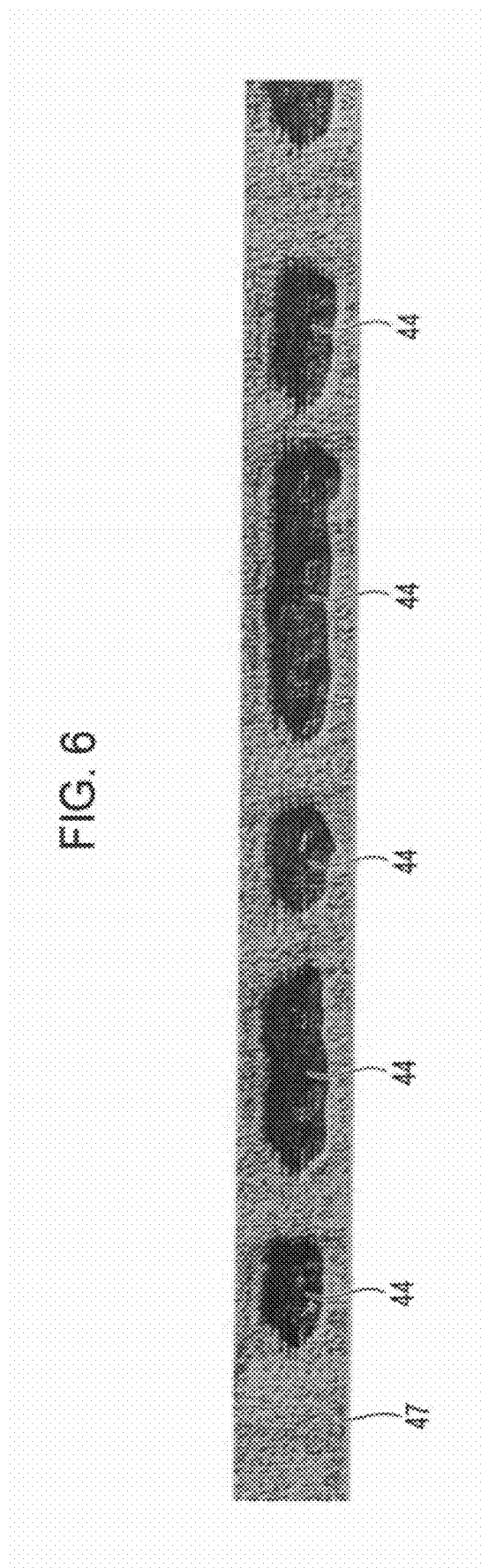

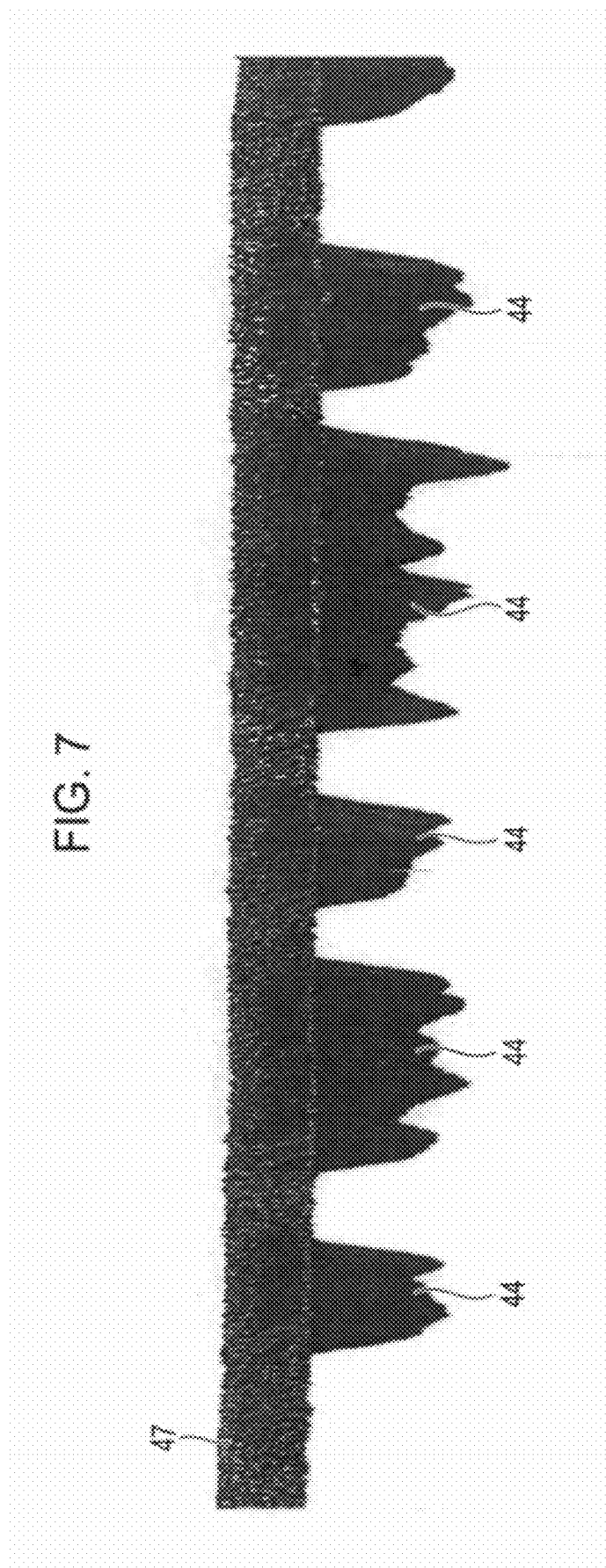

DISC INSPECTING METHOD AND DISC INSPECTING DEVICE

BACKGROUND

The present disclosure relates to a disc inspecting method of an optical information recording medium and the like, and a disc inspecting device used in the disc inspecting method.

In the related art, to confirm the shape of recording marks of a disc used to produce an optical information recording medium, developing is performed after forming the recording marks, and then it is necessary to confirm the formed recording marks by an SEM (scanning electron microscope) or the like. For this reason, the shape is not seen until the developing is performed and the observation is performed by the SEM, it takes the time for confirmation, and efficiency is not satisfactory. In the method of the related art, at the time of observation, alignment (search) between the formation position of the recording marks and the observation point of the SEM is difficult and troublesome. In addition, the observation based on the SEM is necessary, and thus it is difficult to see the shape of the entirety of the recording marks just after cutting.

Meanwhile, a method has been proposed in which a target object is irradiated with a beam of light such as laser, an optical detecting unit receives reflection light thereof, and a delicate pattern is measured (e.g., Japanese Unexamined Utility Model Registration Application No. 58-74108). In this method, the delicate pattern is measured, using a phenomenon where the irradiation light is diffused to cause disorder in the light reception of the optical detecting unit when there is a delicate line or point on the surface of the target object.

SUMMARY

In the inspection method described above, when the recording marks of the optical information recording medium are measured, the length of the formed recording marks is measured in a concentric track direction formed on the optical information recording medium. That is, the formation position of the recording marks on the track of the optical information recording medium is measured.

However, in the measurement method, to measure the formation position of the recording marks, so-called on-track measurement in which the measurement is performed with respect to the center of the formed recording marks is performed. For this reason, a part deviating from the measurement position passing through the center of the recording marks is not measured.

Accordingly, in the inspection method described above, even when the position of the recording marks formed on the optical information recording medium and the length in the track direction, it is difficult to measure the shape of the formed recording marks.

It is desirable to provide a disc inspecting device and a disc inspecting method capable of measuring the entirety of the recording marks.

According to an embodiment of the present disclosure, there is provided a disc inspecting method including: forming recording marks on a disc; scanning the recording marks from inside to outside or from outside to inside of the disc by a pickup unit to read a reproduction signal while rotating a spindle to move a slider by each predetermined width; acquiring reproduction data from the reproduction signal in a signal acquiring unit; and determining whether or not the reproduction data is proper in a calculation unit, and optimizing a formation condition of the recording marks-when it is determined that the reproduction data is not proper.

According to another embodiment of the present disclosure, there is provided a disc inspecting device including: a pickup unit that records and reads a signal on and from a disc; a slider that moves the disc, a signal acquiring unit that acquires the signal read by the pickup unit; and a calculation unit that recognizes a shape of recording marks from the signal acquired from the signal acquiring unit, and compares it with a prescribed value, wherein the slider moves by each regular width at the time of reading the signal such that an area including the entirety of the recording marks is scanned by the pickup unit.

According to the disc inspecting method and the disc inspecting device of the embodiment of the present disclosure, the recording marks are formed on the disc and the reproduction signal is read from the recording marks by the pickup unit. In this case, the pickup unit is scanned from inside to outside or from outside to inside of the disc while moving the slider, and recording marks are read. The recording marks are read as described above, and thus it is possible to thoroughly acquire the reproduction signals in the range in which the recording marks are formed. For this reason, it is possible to obtain the reproduction data for recognizing the shape of the entirety of the recording marks from the recording signals in the signal acquiring unit and the calculation unit. Accordingly, it is possible to confirm the shape of the entirety of the recording marks.

According to the present disclosure, it is possible to provide a disc inspecting device and a disc inspecting method capable of measuring a shape of the entirety of the recording marks.

BRIEF DESCRIPTION OF THE DRAWINGS

FIG. 3 is a flowchart illustrating a disc inspecting method according to an embodiment of the present disclosure.

FIG. 4 is a flowchart illustrating a disc inspecting method according to an embodiment of the present disclosure.

FIG. 5 is a diagram illustrating a reproduction operation of a disc inspecting method according to an embodiment of the present disclosure.

FIG. 6 is a diagram illustrating an example of a 2-dimensional image acquired by a calculation process of a disc inspecting method according to an embodiment of the present disclosure.

FIG. 7 is a diagram illustrating an example of a 3-dimensional image acquired by a calculation process of a disc inspecting method according to an embodiment of the present disclosure.

DETAILED DESCRIPTION OF EMBODIMENTS

Hereinafter, preferred embodiments of the present disclosure will be described by way of example, but the preset disclosure is not limited to the following examples.

The description is performed in the following order.
1. Embodiment of Disc Inspecting Device
2. Embodiment of Disc Inspecting Method
1. Embodiment of Disc Inspecting Device Hereinafter, an embodiment of a disc inspecting device of the present disclosure will be described in detail.

Figure 1:
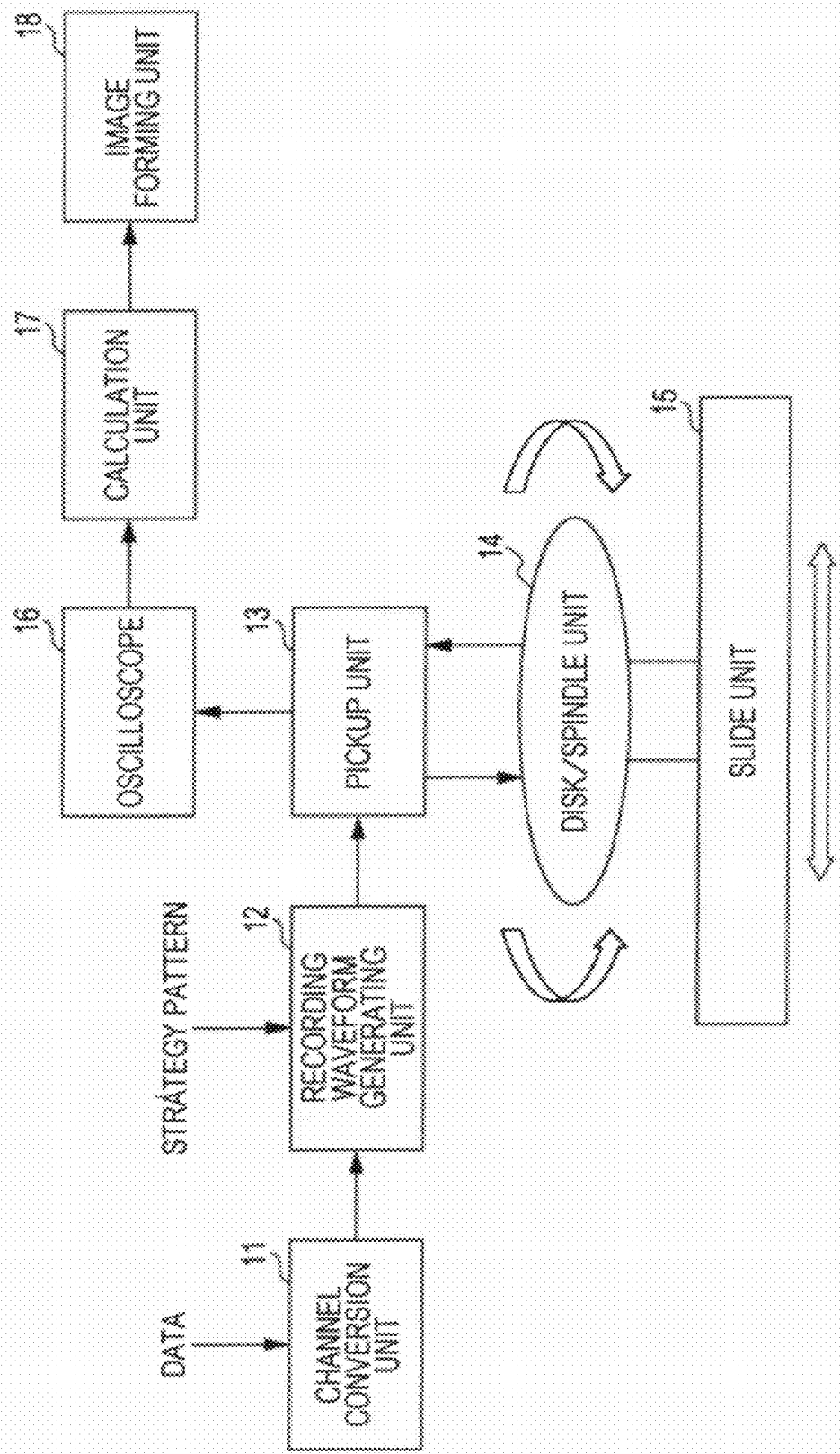
FIG. 1 is a diagram illustrating a configuration of a disc inspecting device according to an embodiment of the present disclosure.

FIG. 1 is a diagram illustrating a configuration of the disc inspecting device of the embodiment. In the embodiment, a disc producing and inspecting device based on a PTM method will be described as an example of the disc inspecting device.

In the PTM method, a disc in which an inorganic resist material is uniformly formed on a disc base by a sputtering method or the like is used. For example, an incomplete oxide of a transition metal is used as the inorganic resist material. For example, Ti, V, Cr, Mn, Nb, Cu, Ni, Co, Mo, Ta, W, Zr, Ru, Ag, or the like are used as the transition metal. The disc coated with the organic resist is irradiated with laser light. The chemical properties of the resist layer are changed by the irradiation of the laser light to perform thermal recording on the resist layer. The irradiation of the laser light is performed on the basis of a modulation signal based on a recording mark, and a predetermined recording mark shape is formed on the disc. Thereafter, developing is performed, the resist layer of the part where the thermal recording is performed by the irradiation of the laser light is removed, and the recording mark is formed.

A disc inspecting device 10 shown in FIG. 1 includes a channel conversion unit 11, a recording waveform generating unit 12, a pickup unit 13, a disc spindle unit 14, a slide unit 15, a signal acquiring unit 16, a calculation unit 17, and an image forming unit 18.

The channel conversion unit 11 generates a modulation signal for recording on the disc from the input recording data. The recording data is a recording mark pattern formed on the optical disc which is finally produced. In the channel conversion unit 11, modulation is performed on the recording data in a modulation manner such as RLL (1, 7), and a data pattern with a run length restricted to, for example, 2T to 9T is output as the modulation pattern.

The modulation signal output from the channel conversion unit 11 is input to the recording waveform generating unit 12. In the recording waveform generating unit 12, conversion into a recording driving waveform is performed using the input recording waveform and a strategy pattern. The strategy pattern used in the conversion is waveform data set corresponding to the length of the modulation signal. In the recording waveform generating unit 12, the strategy pattern is selected according to the run length of the modulation signal supplied from the channel conversion unit 11.

The recording driving waveform output from the recording waveform generating unit 12 is transmitted to the pickup unit 13.

In the pickup unit 13, the laser light is subjected to pulse modulation by the recording driving waveform. The disc of the disc spindle unit 14 is irradiated with the laser light. The disc is irradiated with the pulse-modulated laser light, the property of the inorganic resist layer formed on the surface of the disc is changed by heating, and thus the recording mark is formed.

The disc spindle unit 14 may be a spindle which rotatably drives the disc. The spindle controls a rotation velocity to drive rotatably such that the disc becomes at a constant line velocity. At the time of test recording, the disc coated with the inorganic resist is mounted on the PTM device of the spindle.

When the recording mark is formed on the disc, the slide unit 15 is driven to determine a focus position of a pickup head at a proper position other than an information pattern forming area (e.g., an outer circumferential portion or the like) of the disc. The spindle is rotated to be a predetermined linear velocity, and the inorganic resist is irradiated with the pulse-modulated laser light as much as a period of one rotation of the disc. As described above, a recording mark row of one rotation is formed on the disc by driving the slide unit 15 and the irradiation of the laser light.

Figure 2:
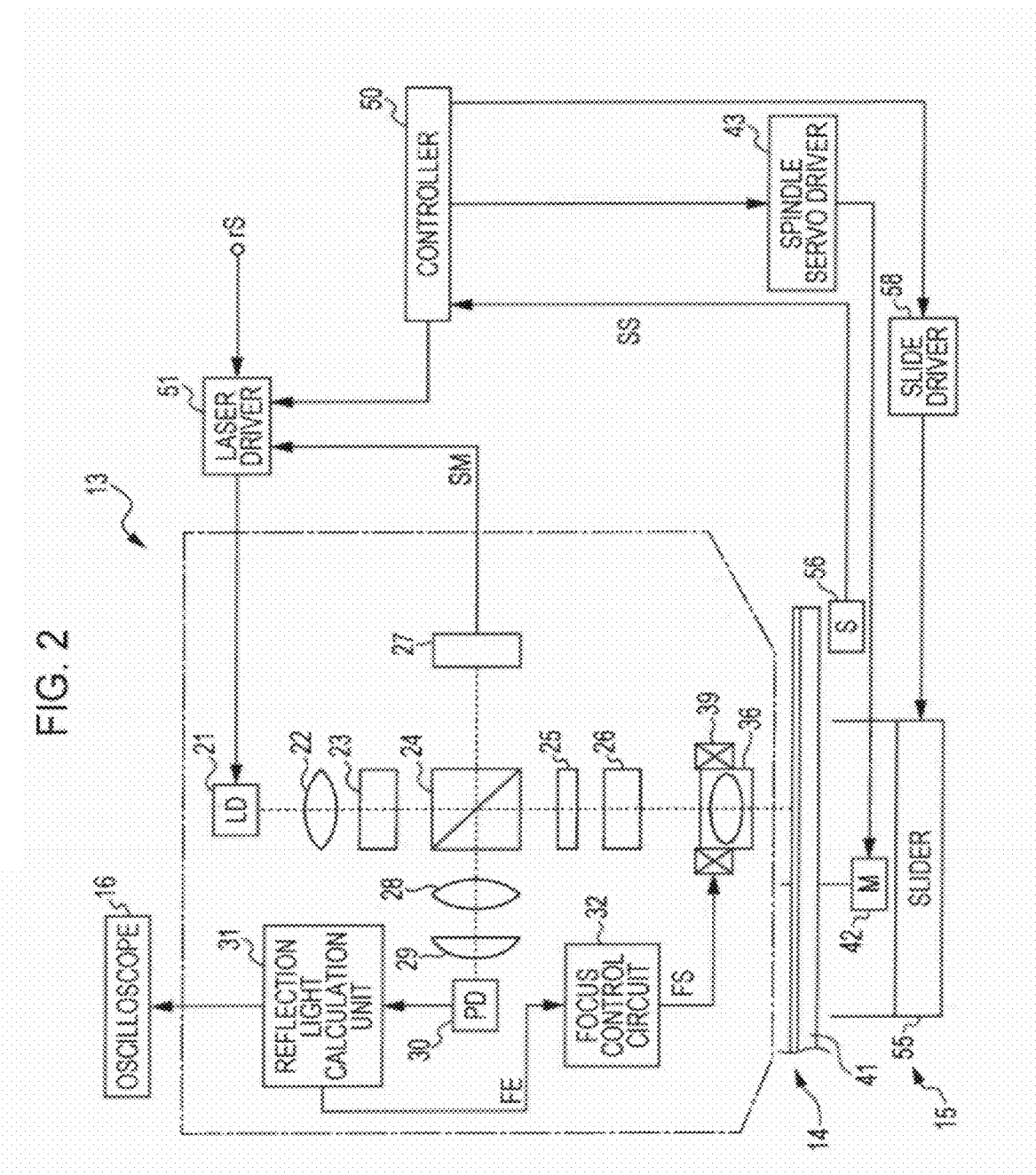
FIG. 2 is a diagram illustrating a configuration of a disc inspecting device according to an embodiment of the present disclosure.

FIG. 2 shows an example of a configuration of the pickup unit 13, the disc spindle unit 14, and the slide unit 15 shown in FIG. 1.

The pickup unit 13 is provided with a laser light source 21 formed of a semiconductor laser or the like. The laser light output from the laser light source 21 made into parallel light by a collimator lens 22, then a spot shape is deformed to, for example, a circular shape by an anamorphic prism 23, and is led to a polarization beam splitter 24.

A polarization component passing through the polarization beam splitter 24 is led to an object lens 36 through a $\lambda/4$ wavelength plate 25 and a beam expander 26, is collected to the object lens 36, and is irradiated onto a disc 41 of a disc spindle unit 14.

The disc 41 is irradiated with the laser light from the laser light source 21 through the object lens 36, and the laser light is focused on the disc 41. In the disc 41, inorganic resistor formed of metal oxide is formed to be a film on, for example, a silicon wafer. The inorganic resistor absorbs the laser beam, and an irradiation portion, particularly, a portion heated around the center to high temperature becomes polycrystalline. The property of the inorganic resist portion is changed by this action, and a light exposure pattern as the recording marks is formed on the disc 41.

The polarization component reflected from the polarization beam splitter 24 is irradiated to a monitor detector 27 (laser power monitor photodetector). The monitor detector 27 outputs a light intensity monitor signal SM corresponding to a received light quantity level (light intensity).

Meanwhile, the returning light of the laser light irradiated to the disc 41 passes through the object lens 36, the beam expander 26, and $\lambda/4$ wavelength plate 25 and reaches the polarization beam splitter 24. In this case, the light passes twice through the $\lambda/4$ wavelength plate 25 on the forward path and backward path, a polarization face is rotated by 90°, and the light is reflected to the polarization beam splitter 24. The returning light reflected to the polarization beam splitter 24 is received through a cylindrical lens 29 by a light receiving face of the photodetector 30.

The light receiving face of the photodetector (PD) 30 is provided with 4-divisional light receiving faces, and obtains a focus error signal based on astigmatism. A current signal corresponding to the received light quantity is output from each light receiving face of the PD 30, and the current signal is supplied to a reflection light calculating circuit 31.

The reflection light calculating circuit 31 converts the current signal from each 4-divisional light receiving face, into a voltage signal, performs a calculation process as an astigmatism method, generates a focus error signal FE, and supplies the focus error signal FE to a focus control circuit 32.

The focus control signal 32 generates a servo driving signal FS of an actuator 39 on the basis of the focus error signal FE. The actuator 39 holds the object lens 36 to be movable in a focus direction. The object lens 36 is driven in an approaching and separating direction with respect to the disc 41 on the basis of the servo driving signal FS, and the focus servo is performed.

The reflection light calculating circuit 31 may add the voltage signal of the received light quantity of each 4-divisional light receiving face of the PD 30, and may generate a reflection light quantity detection signal representing the reflection light level. For example, when the exposure is performed as described above, laser light is output as high level recording power causing the resist layer of the disc 41 to deteriorate by heat. After the exposure portion is formed, the exposure portion is irradiated with laser light with power sufficiently lower than that of the recording time, and thus it is possible to obtain information of the exposure portion and the non-exposure portion as reflection light information (reproduction information).

As described above, when the reproduction is performed after the exposure, the detection signal of the reflection light quantity is generated with respect to the reflection light calculating circuit 31, and the detection signal is output as the reproduction signal to the signal acquiring unit 16.

The light emission of the laser light 21 is driven by a laser driver 51. The recording driving waveform supplied from the recording waveform generating unit 12 to the pickup unit 13 is input to the laser driver 51. The laser driver 51 applies a light emission driving current to the laser light source 21 according to the pulse input forming the recording driving waveform. Accordingly, the pulse light emission of the laser is performed with the light emission intensity corresponding to the pulse pattern as the recording driving waveform.

The light intensity monitor signal SM obtained from the monitor detector 27 is supplied to the laser driver 51. The laser driver 51 compares the light intensity monitor signal SM with a reference value, and controls the laser light emission intensity from the laser light source 21 to be maintained to a predetermined level.

When the exposure of the disc 41 is performed, laser outputting is performed with recording power (e.g., about 9 to 10 mW) from the controller 50 to the laser driver 51. As described above, when the reproduction is performed after the exposure, laser outputting is performed with recording power (e.g., about 0.5 mW) from the controller 50 to the laser driver 51.

The disc spindle unit 14 includes the disc 41, a spindle motor 42, and a spindle servo/driver 43.

The disc 41 is driven to rotate by spindle motor 42. The spindle motor 42 is rotatably driven while the rotation velocity thereof is controlled by the spindle servo/driver 43, to rotate the disc 41 at a constant velocity.

The slide unit 15 includes a slider 55 and a slide driver 58.

The slider 55 is driven by the slide driver 58, to move the whole base including a spindle mechanism on which the disc 41 is mounted. That is, the disc 41 rotated by the spindle motor 42 is exposed to the optical system while moving the disc 41 in the radial direction by the slider 55. Accordingly, a track based on the recording mark row is formed in a spiral shape on the inorganic resist on the disc 41.

The movement position based on the slider 55, that is, the exposure position (disc radial position: slider radial position) of the disc 41 is detected by a sensor 56. Position detection information SS detected by the sensor 56 is supplied to a controller 50.

The controller 50 controls the pickup unit 13, the spindle servo/driver 43, and the slide unit 15. That is, the controller 50 performs laser power setting on the laser driver 51, spindle rotation operation control of the spindle servo/driver 43, and control of a movement operation of the slider 55 of the slide driver 58.

As described above, the exposure and the reproduction can be performed on the disc using the pickup unit 13, the disc spindle unit 14, and the slide unit 15, with the configuration shown in FIG. 2.

The reproduction signal (reflection light information) output by the reproduction operation after the exposure is output to the signal acquiring unit 16 shown in FIG. 1 and FIG. 2. In the inspection device shown in FIG. 1 and FIG. 2, an oscilloscope is shown as an example of the signal acquiring unit 16. As shown in FIG. 1, in the signal acquiring unit (oscilloscope) 16, the reproduction signal is acquired and is subjected to waveform shaping, and is supplied as digital data to the calculation unit 17 by performing A/D conversion.

In calculation unit 17, a calculation process for acquiring the shape of the recording mark formed on the disc is performed on the reproduction signal as the input digital data. The data acquired from the signal acquiring unit 16 is a voltage value representing the reflection light quantity obtained from each spot. For this reason, for example, the calculation for forming an image is performed on the data acquired from the signal acquiring unit 16, and thus it is possible to acquire an image of the recording marks in the image forming unit 18. It is possible to determine whether or not the formed recording mark is proper, from the obtained image.

In addition, it is possible to acquire the formation position of the recording mark by the calculation process, from the data acquired from the signal acquiring unit 16. At the acquired formation position of the recording mark, comparison with a preset prescribed value of the recording mark is performed, and an error from a prescribed value of the recording mark formed on the disc is acquired. It is possible to determine whether or not the formed recording mark is proper.

2. Embodiment of Disc Inspecting Method

Next, an embodiment of a disc inspecting method using the disc inspecting device with the configuration described above will be described. FIG. 3 shows a process flow of disc inspection of the embodiment.

First, in Step S1, test recording (test exposure) is performed at a predetermined position of the disc 41. The data for test recording used in this case may be actual recording data which is actually used, and random data for test recording may be used.

When the test recording is performed, the data for test recording is transmitted to the channel conversion unit 11. The channel conversion unit 11 generates a modulation signal from the recording data for test, and supplies the modulation signal to the recording waveform generating unit 12. The recording waveform generating unit 12 generates a recording driving waveform from the modulation signal, and supplies the recording driving waveform to the pickup unit 13.

In the pickup unit 13, the laser light is subjected to the pulse modulation by the recording driving waveform, and the disc is irradiated with the laser light. In this case, the slide unit 15 is driven by the disc spindle unit 14 to adjust the focus position of the laser light to a predetermined position of the disc 41. The predetermined position of the disc 41 is irradiated with the pulse-modulated laser beam, the characteristics of the resist applied onto the disc surface are changed by heat thereof, and the recording mark is formed. In the test recording, an area other than the information pattern forming area of the disc 41, for example, an area further to the outer circumference than the information pattern forming area is used.

The irradiation position of the laser light is adjusted to a predetermined position, and the spindle is rotated to a predetermined linear velocity. The pulse-modulated laser is irradiated as much as a period of one rotation of the disc 41 to form a recording mark row of one rotation of a concentric shape. As described above, the test recording operation of Step S1 is performed.

In Step S2, the reproduction process of the entirety of the recording marks portion formed by the test recording is performed.

In the controller 50 of the pickup unit 13 shown in FIG. 2, the laser driver 51 is instructed to output the laser with the reproduction power, with the position of the slider 55 fixed at the position of the recording time. Subsequently from the recording time, the rotation of the spindle motor 42 is performed in the spindle servo/driver 43. In this case, the reproduction power is low power different from that of the recording time. The laser is output by continuous light emission from the laser light source 21.

That is, the rotation of the spindle motor in the state where the recording of one track in Step S1 described above is maintained, and the laser power from the laser light source 21 is converted into reproduction power to continuously emit light in a state where the position of the slider 55 is fixed, thereby performing the reproduction operation.

The reproduction signal obtained by the reproduction operation of Step S2 is supplied to the signal acquiring unit 16.

Generally, the reproduction operation of taking out the modulation signal from the recording mark row formed on the disc 41 is performed in a state where the focus of the reproduction laser light from the pickup unit 13 passes through the center of the recording marks, that is, in so called on-track. As described above, the method of adjusting the power and strategy at the recording time by the reproduction operation based on the on-track has been already designed. However, in such a method, the reproduction laser light pass through only the center of the recording marks, and thus it is difficult to inspect the shape of the entirety of the recording marks.

On the contrary, in the reproduction operation of the embodiment, the shape of the entirety of the recording marks is recognized, and thus the reflection light quantity (reproduction signal) is acquired by the signal acquiring unit 16 or the like while operating (scanning) the pickup unit 13 from inside to outside or from outside to inside of the track.

As described above, the reflection light is acquired by scanning the whole area of the recording marks, and thus it is possible to acquire the shape of the entirety of the recording marks.

A specific process flow of the reproduction operation described above is shown in FIG. 4. A reproduction operation image is shown in FIG. 5.

First, by the test recording operation described above, for example, on the disc 41 with a radius of 60 mm, recording marks with a width of 600 nm is recorded in one row with respect to one rotation. By the recording, as shown in FIG. 5, the recording marks 44 arranged in a row are formed on the disc 41.

Then, as the reproduction operation, the slider 55 is positioned such that the focus position of the reproduction laser light is slightly further to the inner circumference side (radius of about 59.99 mm) than the recorded recording mark 44. Then, the spindle is rotated by the number of rotations corresponding to a linear velocity of 5 m/s. In FIG. 5, the slider 55 is positioned such that the position of the scanning line 45A at the upper part of FIG. 5 is the focus position of the reproduction laser light. The reproduction laser light is scanned along the direction of the scanning line 45. In this case, a signal output by one pulse with respect to one rotation of the spindle is called a signal Z. In Step S21, the signal Z is detected.

In Step S22, the reproduction data is acquired by the signal acquiring unit 16 on the basis of the signal Z as a base point. That is, for each rotation of the spindle, the reproduction data obtained along the scanning line 45A shown in FIG. 5 is acquired by the signal acquiring unit 16.

In Step S23, when the reproduction data of one rotation of the spindle is acquired and the signal Z is detected, it is determined whether or not the acquisition of all the reproduction data in the radial direction is completed. When the acquisition in the radial direction is not completed, the slider 55 is moved by 10 nm in the radial direction in FIG. 24, and the detection of the signal Z is performed again. For example, after the spindle is rotated once in a state where the reproduction laser light is scanned along the scanning line 45A shown in FIG. 5, the slider 55 is moved toward the outer circumference in the radial direction by 10 nm, and the slider 55 is positioned such that the position of the scanning line 45B is the focus position of the reproduction laser light. Whenever the spindle is rotated once, the operation of moving the slider 55 toward the outer circumference by each 10 nm is repeated to a predetermined radial position. As described above, the reproduction data for each rotation of the spindle based on the signal Z as the base point are continuously acquired with respect to the range of the radial direction wider than the part where the recording mark is formed.

Specifically, in the disc subjected to the test recording with the condition described above, the reproduction signal starts being changed in the vicinity in which the slider position is a radius of 59.9997 mm. In the vicinity of the radius of 60.0003 mm, the recording mark disappears, and thus the change of the reproduction signal occurs. That is, a plurality of reproduction data of one rotation based on the signal Z as the base point are acquired from start to end of the change of the reproduction signal.

Until the change of the reproduction signal occurs as described above, the operation (scanning) of the reproduction laser light is performed while moving the scanning line in the radial direction, and thus the reproduction data of the entirety of the recording marks are acquired (scanned). In the example, the slider is moved by 10 nm per rotation, but the amount of movement may set as short as the operation precision degree of the slider 55.

Then, in Step S3 shown in FIG. 3, inspection of the reproduction data is performed in the calculation unit 17.

For example, when the reproduction data is acquired by the signal acquiring unit 16, a sampling rate in the signal acquiring unit is set to 500 MSample/s, and the data of the reproduction waveform is acquired.

The further acquired data are rearranged on the basis of the leading, and thus it is possible to obtain a 2-dimensional map in which a length is 10 nm that is the movement width of the slider 55 and a breadth is 0.01 μm (=10 nm) obtained by dividing the linear velocity of 5 m/s by the sampling rate of 500 MSample/s.

The acquired data is a voltage value representing the reflection light quantity obtained from each spot. For example, when the calculation for making the voltage value into 256 gradations for bitmap is calculated, it is possible to acquire the data as an image. An image of the 2-dimensional map obtained by the reproduction condition is shown in FIG. 5.

Correction may be performed on the acquired data to cancel the difference of the circumference from inside to outside or from inside to outside of the track, as necessary.

An example of the 2-dimensional image acquired by the operation process described above is shown in FIG. 6. In the 2-dimensional image shown in FIG. 6, the recording marks 44 is formed in a row on the inorganic resist 47 on the disc. As described above, the shape of the recording marks 44 are processed to the 2-dimensional image, then, for example, the widths of the recording marks are visually confirmed on the 2-dimensional image, and it is possible to inspect the shape of the entirety of the recording marks 44. The recording marks are formed on the disc. While the spindle is rotated to move the slider by each regular width, the recording marks are scanned from inside to outside or from outside to inside of the disc to read the recording signal by the pickup unit. The reproduction data is acquired from the reproduction signal in the signal acquiring unit, and it is determined whether or not the reproduction data is proper in the calculation unit. When the reproduction data is not proper, the formation condition of the recording marks on the disc is optimized.

In addition, it is possible to acquire a 3-dimensional image of the entirety of the shape of the recording marks from the calculation process described above. The 3-dimensional image acquired by the calculation process described is shown in FIG. 7. The 3-dimensional image shown in FIG. 7 is acquired by calculating a voltage value representing the reflection light quantity acquired as the reproduction data. In the 3-dimensional image, it is possible to recognize the shape in the depth direction of the recording marks 44.

In general, in the production of the disc in the PTM method, bubbles are generated in the inorganic resist by irradiation of recording laser, and a convex portion is formed at the exposure portion. When the height of the convex portion is large, the amount of change of the reflection light quantity at the reproducing time gets larger. When the convex portion generated at the exposure portion is high, the amount of change of the inorganic resist by the irradiation of the recording laser is large. For this reason, when the convex portion generated at the exposure portion is high, the amount of change of the inorganic resist tends to increase also in the depth direction of the inorganic resist. As described above, the relation in which the depth of the formed recording mark gets larger when the convex portion generated at the exposure portion gets higher, is formed between the convex portion and the recording mark. That is, it is possible to acquire the height of the convex portion of the inorganic resist and the depth of the recording mark corresponding to the height of the convex portion by the calculation, from the magnitude of the amount of the change of the reflection light quantity with respect to the reproduction data.

By calculating the reproduction data obtained by the reproduction operation, it is possible to confirm the recording mark shape on the surface of the disc from the 2-dimensional image shown in FIG. 6, and it is possible to confirm the depths of the recording marks from the 3-dimensional image shown in FIG. 7. Accordingly, it is possible to recognize the shape of the entirety of the recording marks by the calculation process of Step S3.

In Step S4, it is determined whether or not the shape of the recording marks obtained by the calculation process falls within a reference range. For example, when the laser power at the recording time is high, or when the sensitivity of the inorganic resist is too high, the widths of the recording marks are not regular and are distorted as shown in FIG. 6.

In this case, in Step S5, adjustment is performed to obtain a preferred shape of recording marks by a unit lowering the laser power, to perform optimization of the recording method. After the optimization, the test recording and the reproduction operation are performed again, and thus it is possible to produce the disc on which the proper recording is performed.

The determination of the recording mark shape in Step S4 can be visually performed by making the reproduction data into an image such as the 2-dimensional image and the 3-dimensional image described above. In addition, by the following method, the reproduction data is compared with a preset threshold value, and thus it is possible to perform the determination without the imaging.

Figure 8A:
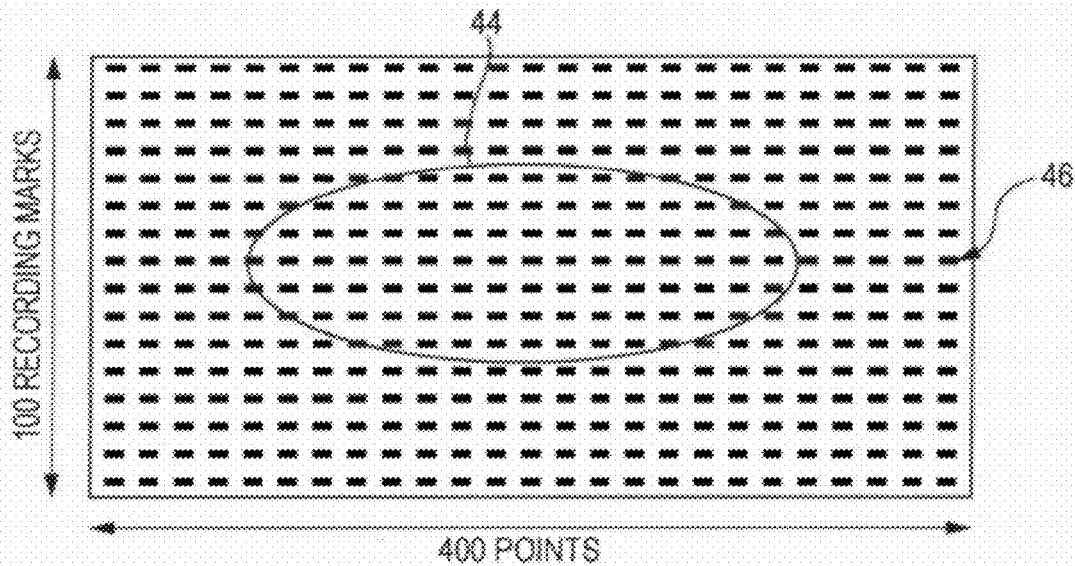
FIG. 8A and FIG. 8B are diagrams illustrating an example of a method of determining a shape of recording marks by comparison with a threshold value in a disc inspecting method according to an embodiment of the present disclosure.
Figure 8B:
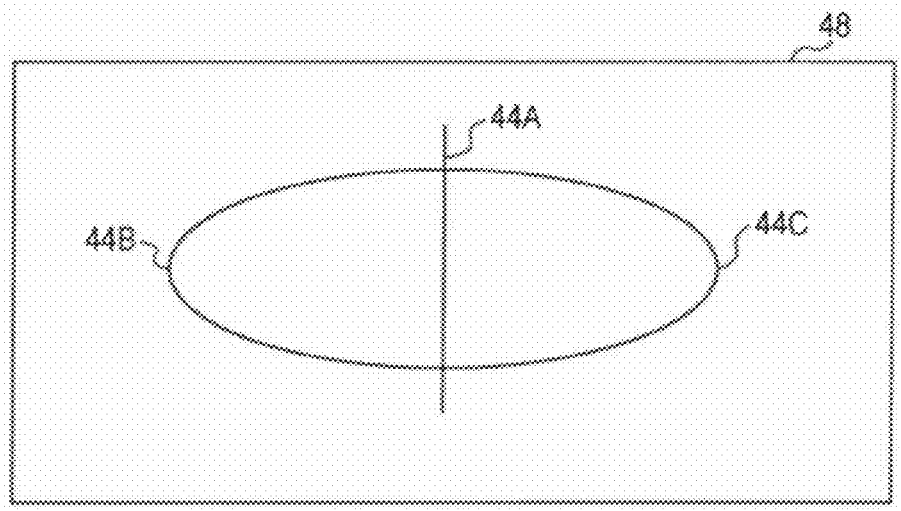

FIG. 8A and FIG. 8B show a method of determining the recording mark shape by the comparison with the threshold value. In the following description, as an example of the method of determining the recording mark shape, a case of determining 11T of a CD will be described.

First, the test recording is performed on the disc (Step S1). FIG. 8A shows the recording marks 44 formed by the test recording. The recording mark 44 has a width of about 600 nm and a length of about 3500 nm.

Then, the reproduction operation of the entirety of the recording mark portions formed by the test recording is performed to acquire the reproduction data (Step S2). Inspection is performed on the acquired reproduction data in the calculation unit (Step S3).

In the inspection of the reproduction data in the calculation unit, for example, a sampling rate in the signal acquiring unit is set to 500 MSample/s and the data of the reproduction waveform is acquired.

Then, to recognize the positions of the formed recording marks, the center portion 46 of the recording marks is analyzed from the acquire data. In addition, the start point 44B and the end point 44C of the recording marks shown in FIG. 8B are found out to acquire the center position 44A of the recording marks. In this case, several marks in the vicinity of the center portion 46 are averaged, and thus it is possible to further reliably acquire the positions of the recording marks. After the recording mark center point 44A is acquired, the range 48 covering the recording marks 44 is determined. In this case, the set position of the range 48 is based on the recording mark center position 44A.

In the reproduction data included in the determined range 48, data of total 40,000 points (broken lines shown in FIG. 8A) are acquired in which data of the spindle rotation direction are 400 points and data in the slide direction are 100 recording marks.

A threshold value of the size of the recording mark produced on the disc in advance is defined within the range 48. Specifically, the range of the threshold value for the (40,000 points) data is determined for each point by a preliminary experiment or the like. For example, a range of "500 mV or lower", "400 mV or higher and 600 mV or lower", or the like is determined. It is compared with the predetermined threshold value one point at a time, and the size of the recording mark is determined from the comparison result (Step S4). A data table is provided for each size of the recording mark, and the determination range and the threshold value are determined.

The formed recording mark shape is out of the range, the laser power or the like is adjusted to optimize the recording method (Step S5)

By the method described above, the condition of the test recording is optimized, and thus it is possible to produce the disc on which the proper recording is performed.

In the disc inspecting method of the embodiment, it is possible to confirm the shape of the entirety of the recording marks without performing the developing process and without performing the observation using the other device such as an SEM after the disc is irradiated with the laser light. For this reason, the adjustment of the power or the strategy at the recording time can be promptly performed in the state where the disc is placed on the disc inspecting device by confirming the reproduction data acquired in the embodiment described above or the image obtained by processing the reproduction data.

In the disc of the PTM method used in the embodiment described above, actually, the inorganic resist layer denatured by the exposure process is removed by the developing process, and then the recording marks of the concave disc are formed.

In the embodiment described above, the change of the reflection light of the inorganic resist layer denatured before performing the developing is measured to predict the shape of the recording marks of the disc.

This is because there is correspondence between the denatured state of the inorganic resist based on the exposure process and the shape of the formed recording marks.

For example, the denatured portion of the inorganic resist is removed by the later developing process, and becomes the recording mark. The shape of the formed recording marks and the shape of the denatured portion substantially coincide with each other. For this reason, it is possible to acquire the final recording mark shape by viewing the change of the reflection light at the denatured portion.

For example, the depth of the formed recording marks is related to the height of the denatured portion of the inorganic resist. Specifically, when the denatured portion swells up from the inorganic resist face to the high position, the recording marks tend to be formed to a deeper position. For this reason, it is possible to acquire the depth of the finally formed recording marks by acquiring the height of the denatured portion from the amount of change of the reflection light at the denatured part.

As described above, it is possible to measure the denatured state of the inorganic resist by measuring the amount of change of the reflection light, and thus it is possible to acquire the shape of the recording marks related to the denatured state.

The present disclosure may be applied to various discs to produce an optical information recording medium, in addition to the disc on which the inorganic resist is formed as described above. Particularly, the present disclosure may be applied to a sample in which the properties thereof are changed by irradiation of laser light and the change of the reflection light caused by the change of the property can be read.

The present disclosure may be applied to fields outside the disc for reproducing the optical information recording medium. For example, the disc is transferred to the other substrate, and the recording marks formed on the disc are transferred to a delicate pattern formed on a substrate or the like. As described above, the present disclosure may be applied in addition to the inspection device and the inspection method of the disc for the optical information recording medium. Particularly, when a delicate pattern is formed by laser light and the delicate pattern is measured using the same laser light as that at the forming time, the present disclosure may be applied.

In the embodiment, the case where the pickup unit is fixed and the disc spindle unit is moved by the slide unit is described. However, the present disclosure is not limited thereto, and the other configuration may be applied. For example, the disc spindle unit may be fixed and the pickup unit may be movable by the slide unit. Alternatively, both may be movable. In the present disclosure, when the positions of the spindle unit and the pickup unit are relatively changed in the disc for recording and reproduction, the other configurations may be applied.

The present disclosure contains subject matter related to that disclosed in Japanese Priority Patent Application JP 2010-228373 filed in the Japan Patent Office on Oct. 8, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A disc inspecting method comprising:
   forming recording marks on a disc;
   scanning the recording marks from inside to outside or from outside to inside of the disc by a pickup unit to read a reproduction signal while rotating a spindle to incrementally move a slider by a predetermined distance for each increment;
   acquiring reproduction data from the reproduction signal in a signal acquiring unit; and
   determining whether or not the reproduction data is outside a predetermined reference range in a calculation unit, and optimizing a formation condition of the recording marks when it is determined that the reproduction data is outside the predetermined reference range,
   wherein in the signal acquiring unit, a sampling rate is set, the reproduction data is acquired, and the reproduction data is rearranged to obtain a 2-dimensional map.

2. The disc inspecting method according to claim 1, wherein in the calculation unit, calculation of a gradation for forming an image is performed to obtain the reproduction data as a 2-dimensional image.

3. The disc inspecting method according to claim 2, wherein a voltage value of the reproduction data is calculated to obtain a 3-dimensional image from the 2-dimensional image.

4. The disc inspecting method according to claim 1, wherein a formation position of the recording marks is acquired based on the reproduction data acquired by the signal acquiring unit, the predetermined reference range includes a preset threshold value, and the data acquired regarding the formation position is compared with the preset threshold value to determine whether or not the reproduction data is proper.

5. A disc inspecting device comprising:
   a pickup unit that records on a disc and reads from the disc a signal;
   a signal acquiring unit that acquires the signal read by the pickup unit;
   a calculation unit that recognizes a shape of a plurality of recording marks based on the signal acquired by the signal acquiring unit and compares datum corresponding to the recognized shape with a predetermined value; and
   a slider that moves the disc,
   wherein the slider moves incrementally at a time of reading the signal such that an area including an entirety of the recording marks is scanned by the pickup unit.

6. An apparatus comprising:
   a scanning unit to scan a plurality of recording marks previously formed on a disc;
   an acquiring unit to acquire reproduction data based on the scanning of said scanning unit;
   a calculation unit to recognize respective shapes of the recording marks based on the acquired reproduction data of said acquiring unit and to determine whether any of the recognized shapes of the recording marks are outside of at least one predetermined parameter; and
   an optimization unit to adjust any recording marks having shapes determined to be outside of the at least one predetermined parameter.

7. The apparatus according to claim 6, wherein the scanning includes scanning an entire area of each of the recording marks.

8. The apparatus according to claim 6, wherein the scanning includes scanning an entirety of an area encompassing the recording marks.

9. The apparatus according to claim 6, wherein the scanning is performed in conjunction with incremental radial movement of at least one of the disc and a pickup unit of said scanning unit relative to each other.

10. The apparatus according to claim 9, wherein the incremental radial movement of the disc is based on movement of a slider.

11. The apparatus according to claim 6, wherein said calculation unit performs calculations for presentation of the reproduction data as a 2-dimensional image.

12. The apparatus according to claim 6, wherein the recognized shape of each of the recording marks is an entire plan view shape thereof.

* * * * *